United States Patent
Nakamura et al.

(10) Patent No.: US 10,459,357 B2
(45) Date of Patent: Oct. 29, 2019

(54) ELECTROPHOTOGRAPHIC PHOTORECEPTOR, PROCESS CARTRIDGE, AND IMAGE FORMING APPARATUS

(71) Applicant: FUJI XEROX CO., LTD., Tokyo (JP)

(72) Inventors: Takahiro Nakamura, Kanagawa (JP); Satoshi Tomita, Kanagawa (JP); Shingo Suda, Kanagawa (JP); Kazunori Onishi, Kanagawa (JP); Hiroshi Hagiwara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/008,354

(22) Filed: Jun. 14, 2018

(65) Prior Publication Data

US 2019/0196346 A1 Jun. 27, 2019

(30) Foreign Application Priority Data

Dec. 27, 2017 (JP) .................................. 2017-252321

(51) Int. Cl.
*G03G 5/00* (2006.01)
*G03G 5/14* (2006.01)
(Continued)

(52) U.S. Cl.
CPC ........... *G03G 5/144* (2013.01); *C09D 175/04* (2013.01); *G03G 5/0542* (2013.01);
(Continued)

(58) Field of Classification Search
CPC ....... G03G 5/142; G03G 5/144; G03G 5/0614
(Continued)

(56) References Cited

U.S. PATENT DOCUMENTS

| 9,846,377 B2 | 12/2017 | Asano et al. |
| 2017/0153559 A1* | 6/2017 | Asano .................... G03G 5/047 |

FOREIGN PATENT DOCUMENTS

| JP | 3852812 B2 | 12/2006 |
| JP | 3990499 B2 | 10/2007 |
| JP | 2017-102171 A | 6/2017 |

* cited by examiner

*Primary Examiner* — Mark A Chapman
(74) *Attorney, Agent, or Firm* — Oliff PLC

(57) ABSTRACT

An electrophotographic photoreceptor includes a conductive substrate; an undercoat layer formed on the conductive substrate and containing a polyurethane resin, metal oxide particles, a silane coupling agent, and a compound represented by General Formula (ID); and a photosensitive layer formed on the undercoat layer General Formula (ID)

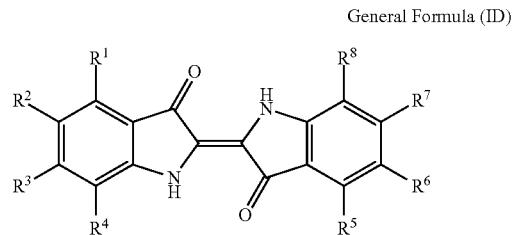

(where $R^1$ to $R^8$ each independently represent a hydrogen atom, a nitro group, a cyano group, a halogen atom, a hydroxyl group, a saturated or unsaturated aliphatic hydrocarbon group optionally having a substituent, an aromatic hydrocarbon group optionally having a substituent, an alkoxy group optionally having a substituent, an aryloxy group optionally having a substituent, a sulfo group optionally having a substituent, an amino group, an alkylamino (Continued)

group optionally having a substituent, or an arylamino group optionally having a substituent).

9 Claims, 4 Drawing Sheets

(51) Int. Cl.
    *G03G 5/06*          (2006.01)
    *G03G 5/05*          (2006.01)
    *G03G 21/18*         (2006.01)
    *G03G 15/00*         (2006.01)
    *C09D 175/04*       (2006.01)
    *C08K 3/22*          (2006.01)

(52) U.S. Cl.
    CPC ......... *G03G 5/0614* (2013.01); *G03G 5/0696* (2013.01); *G03G 5/142* (2013.01); *G03G 15/75* (2013.01); *G03G 21/1803* (2013.01); *C08K 2003/2241* (2013.01); *C08K 2201/005* (2013.01); *C08K 2201/006* (2013.01)

(58) Field of Classification Search
    USPC ...................................... 430/60, 61
    See application file for complete search history.

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2017-252321 filed Dec. 27, 2017.

BACKGROUND

(i) Technical Field

The present invention relates to an electrophotographic photoreceptor, a process cartridge, and an image forming apparatus.

(ii) Related Art

Electrophotographic image forming apparatuses are applied to image forming apparatuses such as copying machines and laser beam printers. The mainstream of electrophotographic photoreceptors used in image forming apparatuses is an organic photoreceptor containing an organic photoconductive material. In general production of the organic photoreceptor, for example, an undercoat layer (also referred to as "intermediate layer") is formed on a conductive substrate, such as an aluminum substrate, and then a photosensitive layer is formed thereon.

SUMMARY

According to an aspect of the invention, there is provided an electrophotographic photoreceptor including a conductive substrate; an undercoat layer formed on the conductive substrate and containing a polyurethane resin, metal oxide particles, a silane coupling agent, and a compound represented by General Formula (ID); and a photosensitive layer formed on the undercoat layer General Formula (ID)

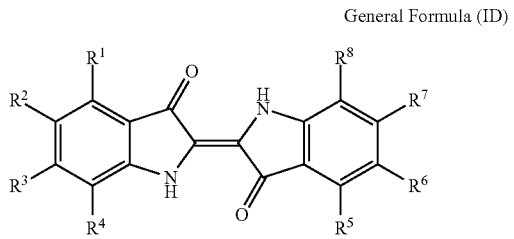

(where $R^1$ to $R^8$ each independently represent a hydrogen atom, a nitro group, a cyano group, a halogen atom, a hydroxyl group, a saturated or unsaturated aliphatic hydrocarbon group optionally having a substituent, an aromatic hydrocarbon group optionally having a substituent, an alkoxy group optionally having a substituent, an aryloxy group optionally having a substituent, a sulfo group optionally having a substituent, an amino group, an alkylamino group optionally having a substituent, or an arylamino group optionally having a substituent; and $R^1$ and $R^2$, $R^2$ and $R^3$, $R^3$ and $R^4$, $R^5$ and $R^6$, $R^6$ and $R^7$, and $R^7$ and $R^8$ are optionally individually bonded to each other to form aromatic rings), wherein an amount of the silane coupling agent is approximately from 5 parts by mass to 15 parts by mass relative to 1 part by mass of the compound represented by General Formula (ID).

BRIEF DESCRIPTION OF THE DRAWINGS

Exemplary embodiments of the present invention will be described in detail based on the following figures, wherein.

DETAILED DESCRIPTION

Exemplary embodiments that are examples of the invention will now be described in detail.

Individual components herein described may be used alone or in combination unless otherwise specified.

In the case where a component includes a combination of different materials, the amount of this component refers to the total amount of these materials unless otherwise specified.

Electrophotographic Photoreceptor

An electrophotographic photoreceptor according to a first exemplary embodiment (also referred to as "photoreceptor") includes a conductive substrate, an undercoat layer disposed on the conductive substrate, and a photosensitive layer disposed on the undercoat layer. The undercoat layer contains a polyurethane resin, metal oxide particles, a silane coupling agent, and a compound represented by General Formula (ID). The amount of the silane coupling agent is approximately from 5 parts by mass to 15 parts by mass relative to 1 part by mass of the compound represented by General Formula (ID).

Such a structure of the photoreceptor according to the first exemplary embodiment enables a reduction in the occurrence of scumming (phenomenon in which toner adheres to the non-image area of a recording medium and forms color dots) in repeated formation of images.

Furthermore, the photoreceptor according to the first exemplary embodiment is likely to reduce an increase in residual potential and the occurrence of the uneven image density even when images are repeatedly formed.

The electrophotographic photoreceptor according to the first exemplary embodiment will now be described in detail with reference to the drawings.

Figure 1:
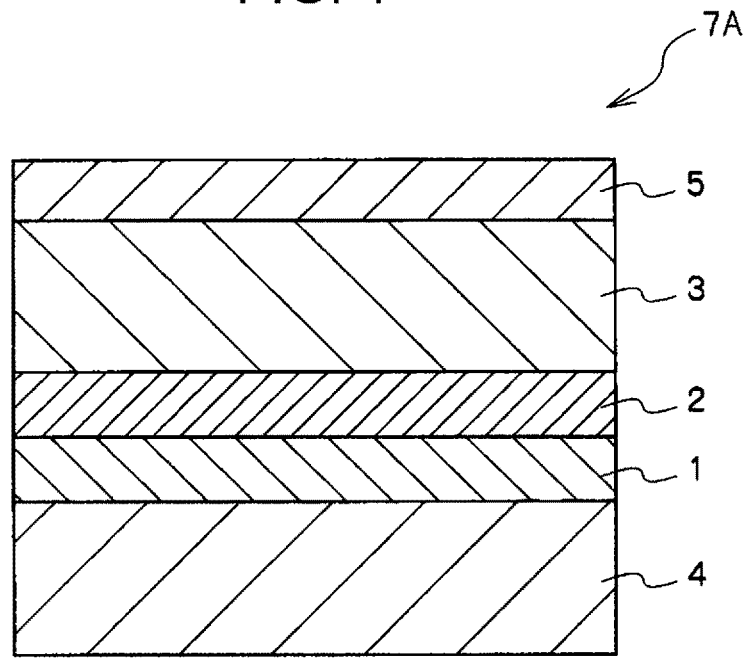
FIG. 1 is a schematic cross-sectional view partially illustrating an example of the layered structure of an electrophotographic photoreceptor according to a first exemplary embodiment.
Figure 2:
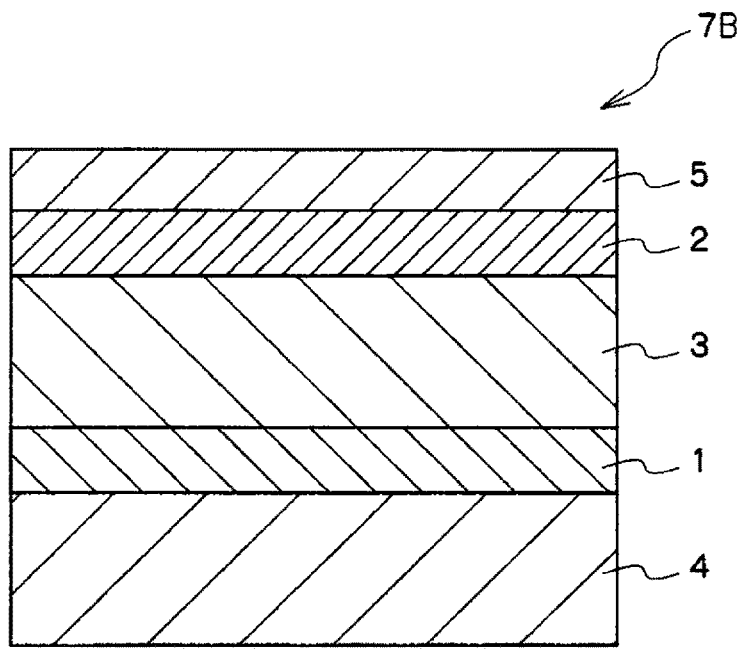
FIG. 2 is a schematic cross-sectional view partially illustrating another example of the layered structure of the electrophotographic photoreceptor according to the first exemplary embodiment.
Figure 3:
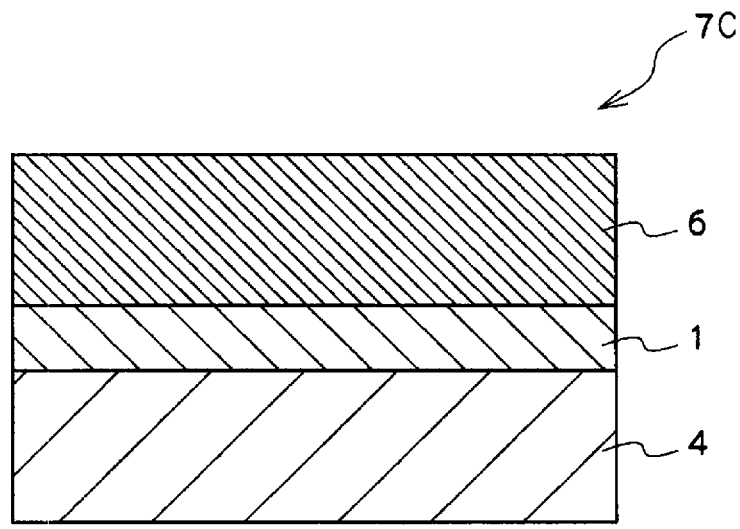
FIG. 3 is a schematic cross-sectional view partially illustrating another example of the layered structure of the electrophotographic photoreceptor according to the first exemplary embodiment.

FIG. 1 is a schematic cross-sectional view illustrating an example of the electrophotographic photoreceptor according to the first exemplary embodiment. FIGS. 2 and 3 are each a schematic cross-sectional view illustrating another example of the electrophotographic photoreceptor according to the first exemplary embodiment.

An electrophotographic photoreceptor 7A illustrated in FIG. 1 is a so-called functionally-separated photoreceptor (layered photoreceptor) and includes a conductive substrate 4; an undercoat layer 1 formed thereon; and a charge-generating layer 2, charge-transporting layer 3, and protective layer 5 disposed in sequence so as to overlie the conductive substrate 4 and the undercoat layer 1. In the electrophotographic photoreceptor 7A, the charge-generating layer 2 and the charge-transporting layer 3 serve as the photosensitive layer.

An electrophotographic photoreceptor 7B illustrated in FIG. 2 is a functionally-separated photoreceptor in which the charge-generating layer 2 and the charge-transporting layer 3 are functionally separated as in the electrophotographic photoreceptor 7A illustrated in FIG. 1.

The electrophotographic photoreceptor 7B illustrated in FIG. 2 includes the conductive substrate 4; the undercoat layer 1 formed thereon; and the charge-transporting layer 3, charge-generating layer 2, and protective layer 5 disposed in sequence so as to overlie the conductive substrate 4 and the undercoat layer 1. In the electrophotographic photoreceptor 7B, the charge-transporting layer 3 and the charge-generating layer 2 serve as the photosensitive layer.

In an electrophotographic photoreceptor 7C illustrated in FIG. 3, a charge-generating material and a charge-transporting material are used in a single layer (single photosensitive layer 6). The electrophotographic photoreceptor 7C illustrated in FIG. 3 includes the conductive substrate 4, the undercoat layer 1 formed thereon, and the single photosensitive layer 6 disposed so as to overlie the conductive substrate 4 and the undercoat layer 1.

Each part of the electrophotographic photoreceptor according to the first exemplary embodiment will now be described. Reference signs are omitted in the following description.

Conductive Substrate

Examples of the conductive substrate include tubular objects or endless belts of metals (such as aluminum, aluminum alloy, nickel, and stainless steel). Other examples of the conductive substrate include tubular objects or endless belts formed by coating the surfaces of supports (such as cylindrical plastic or paper) with metals (aluminum, nickel, chromium, nichrome, copper, gold, silver, and platinum) or with metal oxides (such as tin oxide and indium oxide).

The term "conductive" herein refers to having a volume resistivity of $1 \times 10^{10}$ Ω·cm or less at 25° C.

The conductive substrate may include a support (such as cylindrical plastic or paper) and a conductive layer disposed on the support.

Examples of the conductive layer include layers containing both a conductive agent and a binder resin.

Examples of the conductive agent include fine carbon particles (such as carbon black and acetylene black); metal powder (such as aluminum, nickel, iron, nichrome, copper, zinc, and silver); and powder of metal oxides (such as conductive tin oxide and indium tin oxide).

Examples of the binder resin include thermoplastic resins, thermosetting resins, and photocurable resins. Specific examples thereof include polystyrene resins, styrene-acrylonitrile copolymers, styrene-butadiene copolymers, styrene-maleic anhydride copolymers, polyester resins, polyvinyl chloride resins, vinyl chloride-vinyl acetate copolymers, polyvinyl acetate resins, polyvinylidene chloride resins, polyallylate resins, phenoxy resins, polycarbonate resins, cellulose acetate resins, ethylcellulose resins, polyvinyl butyral resins, polyvinylformal resins, polyvinyltoluene resins, poly-N-vinylcarbazole, acrylic resins, silicone resins, epoxy resins, melamine resins, urethane resins, phenol resins, and alkyd resins.

The conductive layer can be formed by applying a coating liquid containing the above-mentioned materials onto the support. The conductive layer may be formed using a resin tube [such as a tube of polyvinyl chloride, polypropylene, polyester, polystyrene, polyvinylidene chloride, polyethylene, chlorinated rubber, or Teflon (registered trademark)] in which the conductive agent has been dispersed.

Undercoat Layer

The undercoat layer contains a polyurethane resin, metal oxide particles, a silane coupling agent, and the compound represented by General Formula (ID). The undercoat layer may optionally contain other additives.

Polyurethane Resin

The polyurethane resin may be either a thermoplastic resin or a curable resin (such as thermosetting resin or ultraviolet curable resin). Specific examples of the polyurethane resin include polyurethane resins prepared by the reaction of a resin having an OH group (at least one selected from the group consisting of a polyvinyl acetal resin, a polyvinyl resin, casein, and a phenol resin) with an isocyanate compound (such as aromatic polyisocyanate, aliphatic polyisocyanate, or alicyclic polyisocyanate).

The isocyanate compound may be a blocked isocyanate compound (compound in which an isocyanate group is protected by a blocking agent).

In particular, the polyurethane resin is suitably a polyurethane resin having a high solvent resistance to an organic solvent used in a coating liquid for forming the photosensitive layer in view of the photosensitive layer being formed on the undercoat layer. The urethane resin having a high solvent resistance may be a curable resin having a three-dimensional network structure.

Metal Oxide Particles

Examples of the metal oxide particles include titanium oxide particles, zinc oxide particles, tin oxide particles, and zirconium oxide particles. The metal oxide particles are preferably titanium oxide particles or zinc oxide particles, and more preferably titanium oxide particles.

The average particle size of the metal oxide particles is preferably from 20 nm to 200 nm, and more preferably from 50 nm to 150 nm.

The average particle size of the metal oxide particles is determined as follows. A sample is taken from the undercoat layer. The cross section of the sample is observed with a transmission electron microscope (TEM). In the observation field of view, the projected areas of 100 metal oxide particles are determined, and the equivalent circle diameters of the projected areas are calculated. Then, the arithmetic mean of the equivalent circle diameters is calculated and defined as the average particle size of the metal oxide particles.

The amount of the metal oxide particles is, for example, preferably from 10 mass % to 80 mass %, and more preferably from 40 mass % to 80 mass % relative to the amount of the binder resin.

Silane Coupling Agent

In the undercoat layer, the silane coupling agent may be present in the form of a surface treatment agent for the metal oxide particles or in the form of an additive being in a state of molecular dispersion.

The surface treatment of the metal oxide particles with the silane coupling agent refers to a treatment in which the alkoxy groups of the silane coupling agent undergo a hydrolysis reaction in a state in which the silane coupling agent is adsorbed to the surfaces of the metal oxide particles.

Examples of the silane coupling agent include 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

In particular, the silane coupling agent is suitably a silane coupling agent having an amino group [such as 3-aminopropyltriethoxysilane, N-2-(aminoethyl)-3-aminopropyltrimethoxysilane, N-2-(aminoethyl)-3-aminopropylmethyldimethoxysilane, or N,N-bis(2-hydroxyethyl)-3-aminopropyltriethoxysilane] in terms of a reduction in the occurrence of scumming.

The silane coupling agent may be a combination of the silane coupling agent having an amino group with another silane coupling agent.

The amount of the silane coupling agent is approximately from 5 parts by mass to 15 parts by mass relative to 1 part by mass of the compound represented by General Formula (ID) in terms of a reduction in the occurrence of scumming. The amount of the silane coupling agent is preferably from 7 parts by mass to 15 parts by mass, and more preferably from 10 parts by mass to 15 parts by mass in terms of a reduction in the occurrence of scumming.

Compound Represented by General Formula (ID)

The compound represented by General Formula (ID) is indigo or an indigo derivative.

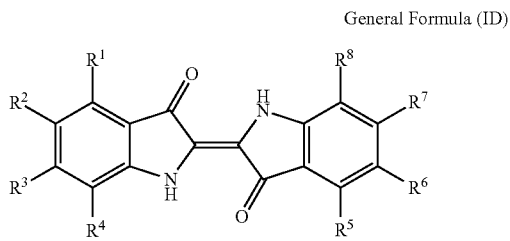

General Formula (ID)

In General Formula (ID), $R^1$ to $R^8$ each independently represent a hydrogen atom, a nitro group, a cyano group, a halogen atom, a hydroxyl group, a saturated or unsaturated aliphatic hydrocarbon group optionally having a substituent, an aromatic hydrocarbon group optionally having a substituent, an alkoxy group optionally having a substituent, an aryloxy group optionally having a substituent, a sulfo group optionally having a substituent, an amino group, an alkylamino group optionally having a substituent, or an arylamino group optionally having a substituent.

$R^1$ and $R^2$, $R^2$ and $R^3$, $R^3$ and $R^4$, $R^5$ and $R^6$, $R^6$ and $R^7$, and $R^7$ and $R^8$ may be individually bonded to each other to form aromatic rings.

Examples of the halogen atom that $R^1$ to $R^8$ represent include a fluorine atom, a chlorine atom, a bromine atom, and an iodine atom.

Examples of the saturated or unsaturated aliphatic hydrocarbon group that $R^1$ to $R^8$ represent include aliphatic hydrocarbon groups having from 1 to 20 carbon atoms (preferably from 1 to 10 carbon atoms, and more preferably from 1 to 5 carbon atoms), such as an alkyl group, an alkenyl group, and an alkynyl group. The saturated or unsaturated aliphatic hydrocarbon group may be linear, branched, or cyclic.

Examples of the substituent that the saturated or unsaturated aliphatic hydrocarbon group that $R^1$ to $R^8$ represent may have include a halogen atom, a hydroxyl group, aromatic hydrocarbon groups optionally having a substituent (such as a halogen atom or a hydroxyl group), an alkoxy group, an amino group, and an alkylamino group.

Examples of the aromatic hydrocarbon group that $R^1$ to $R^8$ represent include aromatic hydrocarbon groups having from 6 to 30 carbon atoms (preferably from 6 to 15 carbon atoms, and more preferably from 6 to 10 carbon atoms), such as a phenylene group, a biphenylene group, a terphenylene group, a naphthalene group, and an anthracene group.

Examples of the substituent that the aromatic hydrocarbon group that $R^1$ to $R^8$ represent may have include a halogen atom; a hydroxyl group; saturated or unsaturated aliphatic hydrocarbon groups optionally having a substituent (such as a halogen atom or a hydroxyl group), such as an alkyl group, an alkenyl group, and an alkynyl group; an alkoxy group; an amino group; and an alkylamino group.

Examples of the alkoxy group that $R^1$ to $R^8$ represent include alkoxy groups having from 1 to 20 carbon atoms (preferably from 1 to 10 carbon atoms, and more preferably from 1 to 5 carbon atoms). The alkyl chain of the alkoxy group may be linear, branched, or cyclic.

Examples of the substituent that the alkoxy group that $R^1$ to $R^8$ represent may have include a halogen atom; a hydroxyl group; saturated or unsaturated aliphatic hydrocarbon groups optionally having a substituent (such as a halogen atom or a hydroxyl group), such as an alkyl group, an alkenyl group, and an alkynyl group; aromatic hydrocarbon groups optionally having a substituent (such as a halogen atom or a hydroxyl group); an alkoxy group; an amino group; and an alkylamino group.

Examples of the aryloxy group that $R^1$ to $R^8$ represent include aryloxy groups having from 6 to 30 carbon atoms (preferably from 6 to 15 carbon atoms, and more preferably from 6 to 10 carbon atoms), such as a phenyloxy group, a biphenylenoxy group, a terphenylenoxy group, a naphthalenoxy group, and an anthracenoxy group.

Examples of the substituent that the aryloxy group that $R^1$ to $R^8$ represent may have include a halogen atom; a hydroxyl group; saturated or unsaturated aliphatic hydrocarbon groups optionally having a substituent (such as a halogen atom or a hydroxyl group), such as an alkyl group, an alkenyl group, and an alkynyl group; aromatic hydrocarbon groups optionally having a substituent (such as a halogen atom or a hydroxyl group); an alkoxy group; an amino group; and an alkylamino group.

Examples of the sulfo group that $R^1$ to $R^8$ represent include a sulfo group ($—SO_3H$) and salts of a sulfo group ($—SO_3X$ where X represents an alkali metal salt).

Examples of the substituent that the sulfo group that $R^1$ to $R^8$ represent may have include saturated or unsaturated aliphatic hydrocarbon groups optionally having a substituent (such as a halogen atom or a hydroxyl group), such as an alkyl group, an alkenyl group, and an alkynyl group, and aromatic hydrocarbon groups optionally having a substituent (such as a halogen atom or a hydroxyl group).

Examples of the alkylamino group that $R^1$ to $R^8$ represent include mono- or di-alkylamino groups substituted with an alkyl group having from 1 to 20 carbon atoms (preferably from 1 to 10 carbon atoms, and more preferably from 1 to 5 carbon atoms).

Examples of the substituent that the alkylamino group that $R^1$ to $R^8$ represent may have include a halogen atom; a hydroxyl group; aromatic hydrocarbon groups optionally having a substituent (such as a halogen atom or a hydroxyl group), such as a phenyl group, an alkyl-substituted phenyl group, and an alkyl-substituted naphthyl group; an alkoxy group; an amino group; and alkylamino group.

Examples of the arylamino group that $R^1$ to $R^8$ represent include mono- or di-arylamino groups substituted with an aryl group having from 6 to 30 carbon atoms (preferably from 6 to 15 carbon atoms, and more preferably from 6 to 10 carbon atoms, such as a phenylene group, a biphenylene group, a terphenylene group, a naphthalene group, or an anthracene group).

Examples of the substituent that the arylamino group that $R^1$ to $R^8$ represent may have include a halogen atom; a hydroxyl group; saturated or unsaturated aliphatic hydrocarbon groups optionally having a substituent (such as a halogen atom or a hydroxyl group), such as an alkyl group, an alkenyl group, and an alkynyl group; an alkoxy group; an amino group; and an alkylamino group.

Among the substituents that the groups that $R^2$ to $R^8$ represent may have, the saturated or unsaturated aliphatic hydrocarbon groups (such as an alkyl group, an alkenyl group, and an alkynyl group) preferably have from 1 to 20 carbon atoms, more preferably from 1 to 10 carbon atoms, and further preferably have from 1 to 5 carbon atoms.

Among the substituents that the groups that $R^2$ to $R^8$ represent may have, the aromatic hydrocarbon groups preferably have from 6 to 30 carbon atoms, more preferably from 6 to 15 carbon atoms, and further preferably have from 6 to 10 carbon atoms.

Examples of the aromatic rings formed by individually bonding $R^1$ and $R^2$, $R^2$ and $R^3$, $R^3$ and $R^4$, $R^5$ and $R^6$, $R^6$ and $R^7$, and $R^7$ and $R^8$ to each other include a benzene ring, a naphthalene ring, and an anthraquinone ring.

The compound represented by General Formula (ID) is suitably a compound in which $R^1$ to $R^8$ each independently represent a hydrogen atom, a halogen atom, a saturated or unsaturated aliphatic hydrocarbon group optionally having a substituent, or a sulfo group optionally having a substituent.

Specific examples of the compound represented by General Formula (ID) include, but are not limited to, the following compounds.

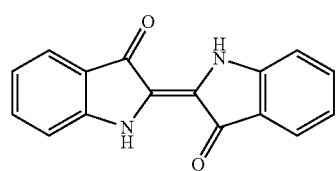

ID-1

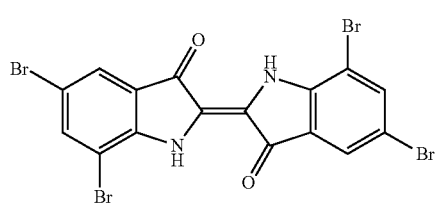

ID-2

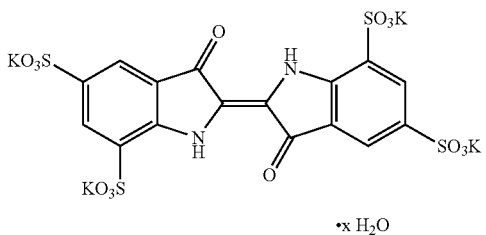

ID-3

·x H$_2$O

The compound represented by General Formula (ID) can be synthesized by known synthetic methods.

The amount of the compound represented by General Formula (ID) is preferably from 0.03 mass % to 3 mass %, more preferably from 0.05 mass % to 1.5 mass %, and further preferably from 0.07 mass % to 1.0 mass % relative to the amount of the metal oxide particles in terms of a reduction in the occurrence of scumming.

Other Additives

Example of other additives that can be used in the undercoat layer include salicylic acid derivatives (compounds having a salicylic acid structure). Use of salicylic acid derivatives is likely to enable a reduction in the occurrence of scumming.

Examples of the salicylic acid derivatives include salicylic acid, acetylsalicylic acid, 5-acetylsalicylic acid, 3-aminosalicylic acid, 5-acetyl salicylamide, 5-aminosalicylic acid, 4-azidesalicylic acid, benzyl salicylate, 4-tert-butylphenyl salicylate, butyl salicylate, 2-carboxyphenyl salicylate, 3,5-dinitrosalicylic acid, dithiosalicylic acid, ethyl acetylsalicylate, 2-ethylhexyl salicylate, ethyl 6-methyl salicylate, ethyl salicylate, 5-formylsalicylic acid, 4-(2-hydroxyethoxy)salicylic acid, 2-hydroxyethyl salicylate, isoamyl salicylate, isobutyl salicylate, isopropyl salicylate, 3-methoxysalicylic acid, 4-methoxysalicylic acid, 6-methoxysalicylic acid, methyl acetylsalicylate, methyl 5-acetylsalicylate, methyl 5-allyl-3-methoxysalicylate, methyl 5-formylsalicylate, methyl 4-(2-hydroxyethoxy) salicylate, methyl 3-methoxysalicylate, methyl 4-methoxysalicylate, methyl 5-methoxysalicylate, methyl 4-methylsalicylate, methyl 5-methylsalicylate, methyl salicylate, 3-methylsalicylic acid, 4-methylsalicylic acid, 5-methylsalicylic acid, methyl thiosalicylate, 4-nitrophenyl salicylate, 5-nitrosalicylic acid, 4-nitrosalicylic acid, 3-nitrosalicylic acid, 4-octylphenyl salicylate, phenyl salicylate, 3-acetoxy-2-naphthanilide, 6-acetoxy-2-naphthoic acid, 3-amino-2-naphthoic acid, 6-amino-2-naphthoic acid, 1,4-dihydroxy-2-naphthoic acid, 3,5-dihydroxy-2-naphthoic acid, 3,7-dihydroxy-2-naphthoic acid, 2-ethoxy-1-naphthoic acid, 2-hydroxy-1-(2-hydroxy-4-sulfo-1-naphthylazo)-3-naphthoic acid, 3-hydroxy-7-methoxy-2-naphthoic acid, 1-hydroxy-2-naphthoic acid, 2-hydroxy-1-naphthoic acid, 3-hydroxy-2-naphthoic acid, 6-hydroxy-1-naphthoic acid, 6-hydroxy-2-naphthoic acid, 3-hydroxy-2-naphthoic acid hydrazide, 2-methoxy-1-naphthoic acid, 3-methoxy-2-naphthoic acid, 6-methoxy-2-naphthoic acid, methyl 6-amino-2-naphthoate, methyl 3-hydroxy-2-naphthoate, methyl 6-hydroxy-2-naphthoate, methyl 3-methoxy-2-naphthoate, phenyl 1,4-dihydroxy-2-naphthoate, and phenyl 1-hydroxy-2-naphthoate.

The amount of the salicylic acid derivatives is preferably from 0.3 mass % to 6 mass %, more preferably from 1.5 mass % to 4.0 mass %, and further preferably from 1 mass % to 3 mass % relative to the amount of the metal oxide particles in terms of a reduction in the occurrence of scumming.

Examples of other additives that can be used in the undercoat layer include known additives such as electron-transporting substances (e.g., electron-transporting pigments such as condensed polycyclic pigments and azo pigments), zirconium chelate compounds, titanium chelate compounds, aluminum chelate compounds, fluorenone compounds, titanium alkoxide compounds, organic titanium compounds, antioxidants, plasticizers, lubricants, ultraviolet absorbers, and leveling agents.

The amount of additives other than the salicylic acid derivatives is suitably from 0.01 mass % to 10 mass % relative to the undercoat layer.

Formation of Undercoat Layer

The undercoat layer can be formed by applying and drying a coating liquid in which the above-mentioned materials have been dissolved or dispersed in a solvent. The undercoat layer can be formed by any of known techniques.

Thickness of Undercoat Layer

The thickness of the undercoat layer is preferably from 5 μm to 50 μm, more preferably from 7 μm to 30 μm, and further preferably from 10 μm to 25 μm.

The thickness of the undercoat layer is determined by measuring the thickness of the undercoat layer at five points with an eddy-current coating thickness meter and then calculating the arithmetic mean thereof.

Charge-Generating Layer

The charge-generating layer contains a binder resin and a charge-generating substance. The charge-generating layer may optionally contain other additives. The charge-generating layer may be a vapor-deposited film of the charge-generating substance.

Binder Resin

Examples of the binder resin used in the charge-generating layer include polyamide resins, polyurethane resins, epoxy resins, polyketone resins, polycarbonate resins, silicone resins, acrylic resins, polyvinyl butyral resins, polyvinyl formal resins, polyvinyl ketone resins, polystyrene resins, poly-N-vinylcarbazole resins, and polyacrylamide resins.

Other examples of the binder resin include charge-transporting polymer materials having a charge-transporting function. Examples thereof include polymer materials having an arylamine skeleton, a benzidine skeleton, a hydrazone skeleton, a carbazole skeleton, a stilbene skeleton, or a pyrazoline skeleton (such as polycarbonate, polyester, polyurethane, polyether, polysiloxane, and acrylic resins) and polymer materials having a polysilane skeleton.

Charge-generating Substance

Examples of the charge-generating substance include inorganic materials and organic materials.

Examples of the inorganic materials used as the charge-generating substance include amorphous silicon (such as amorphous silicon in which a dangling bond is terminated with a hydrogen atom or a halogen atom and amorphous silicon containing a boron atom or a phosphorus atom), crystalline selenium, amorphous selenium, selenium-tellurium compounds, selenium-tellurium-halogen compounds, and selenium-arsenic compounds.

Examples of the organic materials used as the charge-generating substance include phthalocyanine pigments (such as metal phthalocyanine and metal-free phthalocyanine); azulenium salt pigments; squaric acid methine pigments; azo pigments having a carbzole skeleton; azo pigments having a triphenylamine skeleton; azo pigments having a diphenylamine skeleton; azo pigments having a dibenzothiophene skeleton; azo pigments having a fluorenone skeleton; azo pigments having an oxadiazole skeleton; azo pigments having a bisstilbene skeleton; azo pigments having a distyryl oxadiazole skeleton; azo pigments having a distyryl carbazole skeleton; perylene pigments; anthraquinone or polycyclic quinone pigments; quinoneimine pigments; diphenylmethane pigments and triphenylmethane pigments; benzoquinone pigments and naphthoquinone pigments; cyanine pigments and azomethine pigments; indigoid pigments; and bisbenzimidazole pigments.

In particular, the charge-generating substance is suitably an azo pigment that absorbs light having a wavelength of 655 nm. Use of such an azo pigment in the charge-generating layer enables a reduction in the occurrence of moire [defective image caused by interference fringes resulting from scattering of a writing beam (incident light), which has not been absorbed by the charge-generating layer and reached the undercoat layer, at the interface between the charge-generating layer and the undercoat layer, in the undercoat layer, and on the surface of the conductive substrate].

The content ratio of the charge-generating substance to the binder resin is suitably in the range of 10:1 to 1:10 on a mass basis.

Other Additives

Examples of other additives used in the charge-generating layer include known additives such as low-molecular-weight charge-transporting substances (e.g., electron-transporting substances and hole-transporting substances), solvents, antioxidants, plasticizers, lubricants, ultraviolet absorbers, and leveling agents.

The amount of such other additives is suitably from 0.01 mass % to 10 mass % relative to the charge-generating layer.

Formation of Charge-generating Layer

The charge-generating layer can be formed by applying and drying a coating liquid in which the above-mentioned materials have been dissolved or dispersed in a solvent. The charge-generating layer can be formed by any of known techniques.

Thickness of Charge-Generating Layer

The thickness of the charge-generating layer is preferably from 0.01 μm to 5 μm, and more preferably from 0.05 μm to 2 μm.

The thickness of the charge-generating layer is determined by measuring the thickness of the charge-generating layer at five points with an eddy-current coating thickness meter and then calculating the arithmetic mean thereof.

Charge-Transporting Layer

The charge-transporting layer contains a charge-transporting substance. The charge-transporting layer may contain a binder resin in addition to the charge-transporting substance. The charge-transporting layer may optionally contain other additives.

Charge-Transporting Substance

Examples of the charge-transporting substance include low-molecular-weight charge-transporting substances and high-molecular-weight charge-transporting substances.

Examples of the low-molecular-weight charge-transporting substances include electron-transporting substances and hole-transporting substances.

Examples of the electron-transporting substances (electron-accepting substances) include chloranil, bromanil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8- trinitro-4H-indeno[1,2-b]thiophene-4-one, and 1,3,7-trinitrodibenzothiophene-5,5-dioxide.

Examples of the hole-transporting substances (electron-donating substances) include oxazole derivatives, oxadiazole derivatives, imidazole derivatives, triphenylamine derivatives, 9-(p-diethylaminostyrylanthracene), 1,1-bis-(4-dibenzylaminophenyl)propane, styrylanthracene, styrylpyrazoline, phenylhydrazones, α-phenylstilbene derivatives, triazole derivatives, triazole derivatives, phenazine derivatives, acridine derivatives, benzofuran derivatives, benzimidazole derivatives, and thiophene derivatives.

The amount of the low-molecular-weight charge-transporting substance (electron-transporting substance or hole-transporting substance) is preferably from 20 mass % to 90 mass %, and more preferably from 30 mass % to 70 mass % relative to the charge-transporting layer.

Examples of the high-molecular-weight charge-transporting substances include polymers having a carbazole ring, polymers having a hydrazone structure, polysilylene polymers, polymers having a triarylamine structure (such as polymers having a triarylamine structure disclosed in Japanese Patent Nos. 3852812 and 3990499), polymers having an electron donating group, and other polymers.

The amount of the high-molecular-weight charge-transporting substance is preferably from 40 mass % to 90 mass %, and more preferably from 50 mass % to 80 mass % relative to the charge-transporting layer.

Binder Resin

Examples of the binder resin used in the charge-transporting layer include polycarbonate resins, polyester resins, methacrylic resins, acrylic resins, polyethylene resins, polyvinyl chloride resins, polyvinyl acetate resins, polystyrene resins, phenol resins, epoxy resins, polyurethane resins, polyvinylidene chloride resins, alkyd resins, silicone resins, polyvinylcarbazole resins, polyvinyl butyral resins, polyvinylformal resins, polyacrylate resins, polyacrylamide resins, and phenoxy resins.

The charge-transporting layer may contain a copolymer of a cross-linking binder resin with a cross-linking charge-transporting substance.

Other Additives

Examples of other additives used in the charge-transporting layer include solvents, antioxidants, plasticizers, lubricants, ultraviolet absorbers, and leveling agents.

The amount of such other additives is suitably from 0.01 mass % to 10 mass % relative to the amount of the charge-transporting layer.

Formation of Charge-Transporting Layer

The charge-transporting layer can be formed by applying and drying a coating liquid in which the above-mentioned materials have been dissolved or dispersed in a solvent. The charge-transporting layer can be formed by any of known techniques.

Thickness of Charge-Transporting Layer

The thickness of the charge-transporting layer is preferably 50 μm or less, and more preferably 45 μm or less. The thickness of the charge-transporting layer is suitably 5 μm or more.

The thickness of the charge-transporting layer is determined by measuring the thickness of the charge-transporting layer at five points with an eddy-current coating thickness meter and then calculating the arithmetic mean thereof.

Protective Layer

The protective layer (also referred to as "surface layer") contains a binder resin and a filler. The protective layer may optionally contain other additives.

Binder Resin

Examples of the binder resin used in the protective layer include acrylonitrile-styrene resins (AS resins), acrylonitrile-butadiene-styrene resins (ABS resins), acrylonitrile-chlorinated-polyethylene-styrene resins (ACS resins), olefin-vinyl monomer copolymers, chlorinated polyether resins, allyl resins, phenol resins, polyacetal resins, polyamide resins, polyamide imide resins, polyacrylate resins, polyarylsulfone resins, polybutylene resins, polybutylene terephthalate resins, polycarbonate resins, polyethersulfone resins, polyethylene resins, polyethylene terephthalate resins, polyimide resins, acrylic resins, polymethylpentene resins, polypropylene resins, polyphenylene oxide resins, polysulfone resins, polyurethane resins, polyvinyl chloride resins, polyvinylidene chloride resins, and epoxy resins. Among these, the binder resin is suitably polycarbonate resins or polyacrylate resins.

Fillers

Examples of the fillers include metal oxide particles.

The metal oxide particles are not particularly limited and may be appropriately selected for the intended purpose. Examples of the metal oxide particles include aluminum oxide, zinc oxide, titanium oxide, tin oxide, antimony oxide, indium oxide, bismuth oxide, indium oxide containing tin, tin oxide containing antimony or tantalum, and zirconium oxide containing antimony.

Other Additives

Examples of other additives used in the protective layer include solvents, antioxidants, plasticizers, lubricants, ultraviolet absorbers, and leveling agents.

The amount of such other additives is suitably from 0.01 mass % to 10 mass % relative to the protective layer.

Formation of Protective Layer

The protective layer can be formed by applying and drying a coating liquid in which the above-mentioned materials have been dissolved or dispersed in a solvent. The protective layer can be formed by any of known techniques.

Thickness of Protective Layer

The thickness of the protective layer is preferably from 1 μm to 20 μm, more preferably from 2 μm to 10 μm, and further preferably from 1 μm to 5 μm.

The thickness of the protective layer is determined by measuring the thickness of the protective layer at five points with an eddy-current coating thickness meter and then calculating the arithmetic mean thereof.

The protective layer may be a layer of a cured film (crosslinked film). Examples of such a layer include the following layers (1) and (2).

(1) Layer of a cured film made of a composition that contains a reactive-group-containing charge-transporting material of which one molecule has both a reactive group and a charge-transporting skeleton (in other words, layer containing a polymer or crosslinked product of the reactive-group-containing charge-transporting material)

(2) Layer of a cured film made of a composition that contains a nonreactive charge-transporting material and a reactive-group-containing non-charge-transporting material that does not have a charge-transporting skeleton but has a reactive group (in other words, layer containing the nonreactive charge-transporting material and a polymer or crosslinked product of the reactive-group-containing non-charge-transporting material)

Single-Layer Photosensitive Layer

The single-layer photosensitive layer (charge-generating/charge-transporting layer) is, for example, a layer containing a charge-generating material, a charge-transporting material, and optionally a binder resin and other known additives.

These materials are the same as those described as the materials used for forming the charge-generating layer and the charge-transporting layer.

The amount of the charge-generating material contained in the single-layer photosensitive layer is suitably from 0.1 mass % to 10 mass %, and preferably from 0.8 mass % to 5 mass % relative to the total solid content. The amount of the charge-transporting material contained in the single-layer photosensitive layer is suitably from 5 mass % to 50 mass % relative to the total solid content.

The single-layer photosensitive layer is formed by the technique the same as those for forming the charge-generating layer and the charge-transporting layer.

The thickness of the single-layer photosensitive layer is, for instance, suitably from 5 μm to 50 μm, and preferably from 10 μm to 40 μm.

Another Layer

The photoreceptor according to the first exemplary embodiment may include an intermediate layer formed between the photosensitive layer and the protective layer in view of movement of the components of the photosensitive layer to the protective layer and an enhancement in the adhesiveness between the photosensitive layer and the protective layer.

Examples of the intermediate layer include resin layers of polyamide, alcohol-soluble nylon, polyvinyl butyral, and polyvinyl alcohol. The intermediate layer may contain other additives (such as antioxidants, plasticizers, lubricants, ultraviolet absorbers, and leveling agents).

The thickness of the intermediate layer is suitably from 0.05 μm to 2 μm.

The photoreceptor according to the first exemplary embodiment may further include an additional undercoat layer formed between the conductive substrate and the undercoat layer or between the undercoat layer and the photosensitive layer.

Examples of such an additional undercoat layer include resin layers of polyamide, alcohol-soluble nylon, polyvinyl butyral, and polyvinyl alcohol. The additional undercoat layer may contain other additives (such as antioxidants, plasticizers, lubricants, ultraviolet absorbers, and leveling agents).

The thickness of the additional undercoat layer is suitably from 0.05 μm to 2 μm.

Other Suitable Additives

Each of the layers (undercoat layer, charge-generating layer, charge-transporting layer, protective layer, single-layer photosensitive layer, intermediate layer, and additional undercoat layer) of the photoreceptor according to the first exemplary embodiment suitably contains at least one selected from the group consisting of antioxidants, plasticizers, lubricants, ultraviolet absorbers, and leveling agents as other additives in order to suppress a reduction in sensitivity and an increase in residual potential.

Examples of the antioxidants include phenol compounds, paraphenylene diamines, hydroquinones, organic sulfur compounds, and organic phosphorus compounds.

Examples of the plasticizers include plasticizers of general resins such as dibutyl phthalate and dioctyl phthalate.

Examples of the lubricants include hydrocarbon compounds, fatty acid compounds, fatty acid amide compounds, ester compounds, alcohol compounds, metal soaps, natural waxes, and other lubricants.

Examples of the ultraviolet absorbers include benzophenone ultraviolet absorbers, salicylate ultraviolet absorbers, benzotriazole ultraviolet absorbers, cyanoacrylate ultraviolet absorbers, quenchers (metallic complex salt ultraviolet absorbers), and hindered amine light stabilizers (HALSs).

Examples of the leveling agents include silicone oils, such as dimethyl silicone oils and methylphenyl silicone oils, and polymers or oligomers having a perfluoroalkyl group on a side chain.

Image Forming Apparatus (and Process Cartridge)

An image forming apparatus according to a second exemplary embodiment includes an electrophotographic photoreceptor, a charging unit that charges the surface of the electrophotographic photoreceptor, an electrostatic latent image forming unit that forms an electrostatic latent image on the charged surface of the electrophotographic photoreceptor, a developing unit that develops the electrostatic latent image on the surface of the electrophotographic photoreceptor with a developer containing toner to form a toner image, and a transfer unit that transfers the toner image to the surface of a recording medium. The electrophotographic photoreceptor is the electrophotographic photoreceptor according to the first exemplary embodiment.

The image forming apparatus according to the second exemplary embodiment may be any of the following known image forming apparatuses: an apparatus which has a fixing unit that fixes the toner image transferred to the surface of a recording medium, a direct-transfer-type apparatus in which the toner image formed on the surface of the electrophotographic photoreceptor is directly transferred to a recording medium, an intermediate-transfer-type apparatus in which the toner image formed on the surface of the electrophotographic photoreceptor is subjected to first transfer to the surface of an intermediate transfer body and in which the toner image transferred to the surface of the intermediate transfer body is then subjected to second transfer to the surface of a recording medium, an apparatus which has a cleaning unit that cleans the surface of the electrophotographic photoreceptor after the transfer of a toner image and before the charging of the electrophotographic photoreceptor, an apparatus which has a charge-neutralizing unit that radiates light to the surface of the electrophotographic photoreceptor for removal of charges after the transfer of a toner image and before the charging of the electrophotographic photoreceptor, and an apparatus which has an electrophotographic photoreceptor heating member that heats the electrophotographic photoreceptor to decrease the relative temperature.

In the case where the charge-neutralizing unit that removes charges on the surface of the electrophotographic photoreceptor after the transfer of a toner image (namely, after a toner image formed on the surface of the electrophotographic photoreceptor is transferred by the transfer unit) and before the charging of the electrophotographic photoreceptor (namely, before the surface of the electrophotographic photoreceptor is charged by the charging unit) is not provided, charges are accumulated particularly at the interface between the photosensitive layer and the undercoat layer, which readily results in the occurrence of ghosts. Use of the electrophotographic photoreceptor according to the first exemplary embodiment, however, enables an easy reduction in the occurrence of ghosts without the charge-neutralizing unit.

In the intermediate-transfer-type apparatus, the transfer unit, for example, includes an intermediate transfer body of which a toner image is to be transferred to the surface, a first transfer unit for first transfer of the toner image formed on the surface of the electrophotographic photoreceptor to the surface of the intermediate transfer body, and a second transfer unit for second transfer of the toner image transferred to the surface of the intermediate transfer body to the surface of a recording medium.

The image forming apparatus according to the second exemplary embodiment may be either of a dry development type and a wet development type (development with a liquid developer is performed).

In the structure of the image forming apparatus according to the second exemplary embodiment, for instance, the part that includes the electrophotographic photoreceptor may be in the form of a cartridge that is removably attached to the image forming apparatus (process cartridge). A suitable example of the process cartridge to be used is a process cartridge including the electrophotographic photoreceptor according to the first exemplary embodiment. The process cartridge may include, in addition to the electrophotographic photoreceptor, at least one selected from the group consisting of, for example, the charging unit, the electrostatic latent image forming unit, the developing unit, and the transfer unit.

Examples of the image forming apparatus according to the second exemplary embodiment will now be described; however, the image forming apparatus according to the second exemplary embodiment is not limited thereto. The parts shown in the drawings are described, while description of the other parts is omitted.

Figure 4:
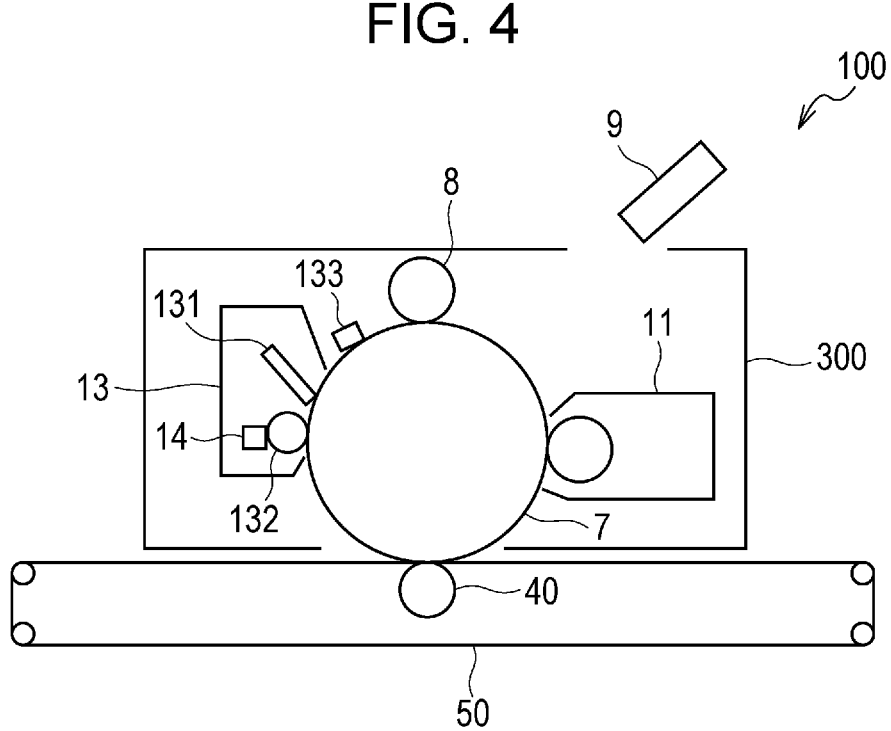
FIG. 4 schematically illustrates the structure of an image forming apparatus according to a second exemplary embodiment.

FIG. 4 schematically illustrates an example of the structure of the image forming apparatus according to the second exemplary embodiment.

As illustrated in FIG. 4, an image forming apparatus 100 according to the second exemplary embodiment includes a process cartridge 300 having an electrophotographic photoreceptor 7, an exposure device 9 (example of the electrostatic latent image forming unit), a transfer device 40 (first transfer device), and an intermediate transfer body 50. In the image forming apparatus 100, the exposure device 9 is disposed such that the electrophotographic photoreceptor 7 can be irradiated with light through the opening of the process cartridge 300, the transfer device 40 is disposed so as to face the electrophotographic photoreceptor 7 with the intermediate body 50 interposed therebetween, and the intermediate body 50 is placed such that part thereof is in contact with the electrophotographic photoreceptor 7. Although not illustrated, the image forming apparatus also includes a second transfer device that transfers a toner image transferred to the intermediate transfer body 50 to a recording medium (e.g., paper). In this case, the intermediate transfer body 50, the transfer device 40 (first transfer device), and the second transfer device (not illustrated) are an example of the transfer unit.

In the process cartridge 300 illustrated in FIG. 4, a housing integrally accommodates the electrophotographic photoreceptor 7, the charging device 8 (example of the charging unit), the developing device 11 (example of the developing unit), and the cleaning device 13 (example of the cleaning unit). The cleaning device 13 has a cleaning blade 131 (example of a cleaning member), and the cleaning blade 131 is disposed so as to be in contact with the surface of the electrophotographic photoreceptor 7. The cleaning member does not need to be in the form of the cleaning blade 131 and may be a conductive or insulating fibrous member; this fibrous member may be used alone or in combination with the cleaning blade 131.

The example of the image forming apparatus in FIG. 4 includes a fibrous member 132 (roll) that supplies a lubricant 14 to the surface of the electrophotographic photoreceptor 7 and a fibrous member 133 (flat brush) that supports the cleaning, and these members are optionally provided.

Each part of the image forming apparatus according to the second exemplary embodiment will now be described.

Charging Device

Examples of the charging device 8 include contact-type chargers that involve use of a conductive or semi-conductive charging roller, charging brush, charging film, charging rubber blade, or charging tube. Any of other known chargers may be used, such as a non-contact-type roller charger and a scorotron or corotron charger in which corona discharge is utilized.

Exposure Device

Examples of the exposure device 9 include optical systems that expose the surface of the electrophotographic photoreceptor 7 to light, such as light emitted by or from a laser diode (LD), a light-emitting diode (LED), a liquid crystal shutter, a fluorescent lamp, a tungsten lamp, a halogen lamp, a mercury lamp, a sodium-vapor lamp, or electroluminescence (EL), in the shape of the intended image. The wavelength of a light source is within the spectral sensitivity of the electrophotographic photoreceptor. The light from a semiconductor laser is generally near-infrared light having an oscillation wavelength near 780 nm. The wavelength of the light is, however, not limited thereto; laser light having an oscillation wavelength of the order of 600 nm or blue laser light having an oscillation wavelength ranging from 400 nm to 450 nm may be employed. A surface-emitting laser source that can emit multiple beams is also effective for formation of color images.

The exposure device 9 may include a variety of filters, such as a sharp cut filter, a band pass filter, a near-infrared cut filter, a dichroic filter, an interference filter, and a color temperature conversion filter, to emit only the light having the intended wavelength.

Developing Device

Examples of the developing device 11 include general developing devices that develop images through contact or non-contact with a developer. The developing device 11 is not particularly limited provided that it has the above-mentioned function, and a proper structure for the intended use is selected. An example of the developing device 11 is a known developing device that functions to attach a one-component or two-component developer to the electrophotographic photoreceptor 7 with a brush or a roller. In particular, a developing device including a developing roller of which the surface holds a developer is suitable.

The developer used in the developing device 11 may be either of a one-component developer of toner alone and a two-component developer containing toner and a carrier. The developer may be either magnetic or non-magnetic. Any of known developers may be used.

Cleaning Device

The cleaning device 13 is a cleaning-blade type in which the cleaning blade 131 is used.

The cleaning device 13 may have a structure other than the cleaning-blade type. In particular, fur brush cleaning, web cleaning, or magnetic brush cleaning may be employed; alternatively, the cleaning may be performed at the same time as the developing.

Transfer Device

Examples of the transfer device 40 include known transfer chargers such as contact-type transfer chargers having a belt, a roller, a film, or a rubber blade and scorotron or corotron transfer chargers in which corona discharge is utilized.

The transfer device 40 does not need to be an electrostatic transfer device and may be a mechanical transfer device (adhesive transfer device or pressure transfer device) or a magnetic transfer device.

Intermediate Transfer Body

The intermediate transfer body 50 is, for instance, in the form of a belt (intermediate transfer belt) containing a semi-conductive polyimide, polyamide imide, polycarbonate, polyarylate, polyester, or rubber. The intermediate transfer body may be in the form other than a belt, such as a drum.

Figure 5:
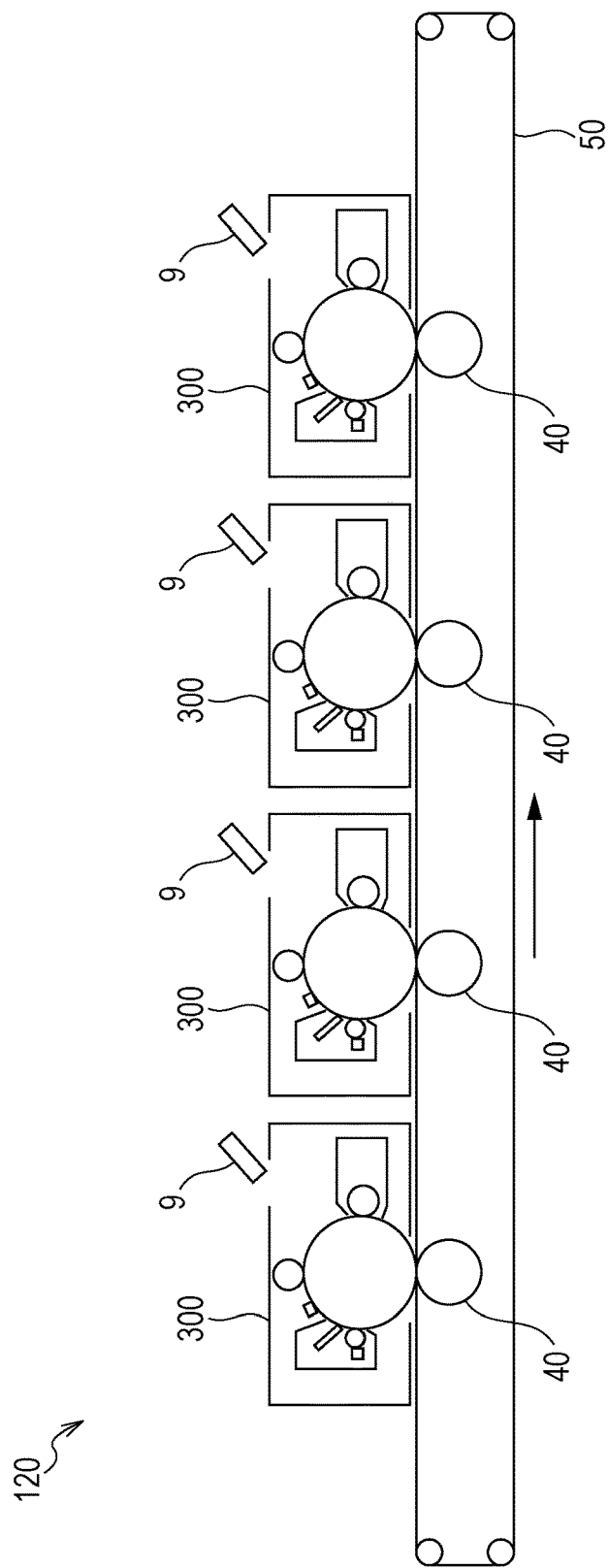
FIG. 5 schematically illustrates the structure of another image forming apparatus according to the second exemplary embodiment.

FIG. 5 schematically illustrates another example of the structure of the image forming apparatus according to the second exemplary embodiment.

An image forming apparatus 120 illustrated in FIG. 5 is a tandem-type multicolor image forming apparatus including four process cartridges 300. In the image forming apparatus 120, the four process cartridges 300 are disposed in parallel so as to overlie the intermediate transfer body 50, and one electrophotographic photoreceptor serves for one color. Except that the image forming apparatus 120 is a tandem type, it has the same structure as the image forming apparatus 100.

The structure of the image forming apparatus 100 according to the second exemplary embodiment is not limited to the above-mentioned structures. For instance, a first charge-neutralizing device that makes residual toner have the same polarity to easily remove the residual toner with a cleaning brush may be provided near the electrophotographic photoreceptor 7 downstream of the transfer device 40 and upstream of the cleaning device 13 in the rotational direction of the electrophotographic photoreceptor 7. Furthermore, a second charge-neutralizing device that neutralizes the charge on the surface of the electrophotographic photoreceptor 7 may be provided downstream of the cleaning device 13 and upstream of the charging device 8 in the rotational direction of the electrophotographic photoreceptor 7.

The structure of the image forming apparatus 100 according to the second exemplary embodiment is not limited to the above-mentioned structures and may have a known structure; for instance, a direct transfer system may be employed, in which a toner image formed on the electrophotographic photoreceptor 7 is directly transferred to a recording medium.

Figure 6:
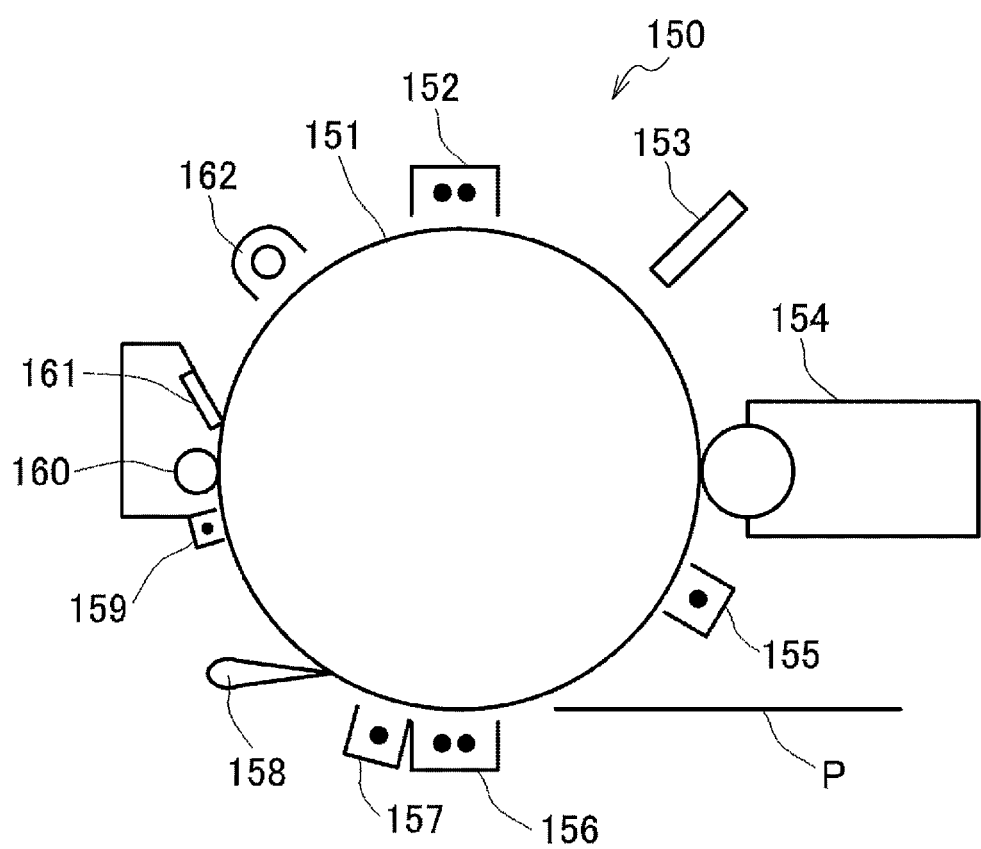
FIG. 6 schematically illustrates the structure of another image forming apparatus according to the second exemplary embodiment.

Another example of the image forming apparatus 100 according to the second exemplary embodiment is an image forming apparatus 150 illustrated in FIG. 6.

The image forming apparatus 150 illustrated in FIG. 6 includes a photoreceptor 151 and a charging device 152, exposure device 153, developing device 154, transfer device 156, fur brush 160, and cleaning blade 161 that are disposed clockwise around the photoreceptor 151 in sequence in FIG. 6.

The image forming apparatus 150 illustrated in FIG. 6 includes a pre-transfer discharger 155 disposed near the photoreceptor 151 and between the developing device 154 and the transfer device 156 for better transfer of a toner image to a recording medium P.

The image forming apparatus 150 illustrated in FIG. 6 includes a separation discharger 157 and separation claw 158 that are each disposed near the photoreceptor 151 and between the transfer device 156 and the fur brush 160 to separate the recording medium P from the photoreceptor 151. Any of other known techniques may be used to separate the recording medium P from the photoreceptor 151, such as electrostatic-attraction-induced separation, side-edge belt separation, tip-grip conveyance, and self-stripping.

The image forming apparatus 150 illustrated in FIG. 6 includes a pre-cleaning discharger 159 that is disposed near the photoreceptor 151 and between the separation claw 158 and the fur brush 160 to improve the cleaning efficiency of the fur brush 160 and cleaning blade 161.

Each of the dischargers may be a corotron discharger or a scorotron discharger.

EXAMPLES

Exemplary embodiments of the invention will now be described in detail with reference to Examples but are not limited thereto. In the following description, the terms "part" and "%" are on a mass basis unless otherwise specified.

Example 1

Formation of Undercoat Layer

With 100 parts by mass of titanium oxide particles (manufactured by TAYCA CORPORATION, average particle size: 70 nm, and specific surface area: 16 $m^2/g$), 500 parts by mass of tetrahydrofuran is mixed by stirring. Then, 1.25 parts by mass of KBM603 [N-2-(aminoethyl)-3-aminopropyltrimethoxysilane, manufactured by Shin-Etsu Chemical Co., Ltd.] as a silane coupling agent (surface treatment agent) is added thereto, and the resulting mixture is stirred for 2 hours. Methanol is subsequently removed by distillation under reduced pressure, and the resulting product is baked at 120° C. for 3 hours to produce titanium oxide particles each having a surface treated with the silane coupling agent.

Surface-treated titanium oxide particles: 101.25 parts
[titanium oxide particles each having a surface treated with the silane coupling agent (amount of the coupling agent for the treatment: 1.25 parts relative to 100 parts of the titanium oxide particles); namely, the amount of surface-untreated titanium oxide particles is 100 parts, and the amount of the silane coupling agent is 1.25 parts]
Blocked isocyanate: 13 parts
[Sumidur BL-3175 (solid concentration: 75%), manufactured by Sumitomo Bayer Urethane Co., Ltd.]
20-mass % solution of a butyral resin in 2-butanone: 50 parts
(butyral resin: S-LEC BM-1, manufactured by SEKISUI CHEMICAL CO., LTD.)
Compound represented by General Formula (ID) [exemplary compound (ID-1)]: 0.1 part
Salicylic acid derivative: 1.5 parts
[3,5-di-tert-butylsalicylic acid (TCI-D1947, manufactured by Tokyo Chemical Industry Co., Ltd.)]
Solvent (2-butanone): 120 parts These materials are mixed with each other by stirring with zirconium beads having a diameter of 0.5 mm and a vibration mill at 1500 rpm for 24 hours to prepare a coating liquid for forming an undercoat layer.

The coating liquid for forming an undercoat layer is applied onto an aluminum cylinder (diameter of 100 mm and length of 380 mm) by dip coating and dried at 170° C. for 30 minutes to form an undercoat layer having an average thickness of 30 μm.

Formation of Charge-Generating Layer

Charge-generating substance: 8 parts of titanyl phthalocyanine
Binder resin: 5 parts of polyvinyl butyral (S-LEC BX-1, manufactured by SEKISUI CHEMICAL CO., LTD.)
Solvent: 400 parts of 2-butanone These materials are mixed with each other by stirring with glass beads having a diameter of 1 mm and a bead mill for 8 hours to prepare a coating liquid for forming a charge-generating layer.

Then, the coating liquid for forming a charge-generating layer is applied onto the undercoat layer by dip coating and dried at 90° C. for 30 minutes to form a charge-generating layer having an average thickness of 0.2 μm.

Formation of Charge-Transporting Layer

Charge-transporting substance: 7 parts of charge-transporting substance represented by Formula (CTM1)

Binder resin: 10 parts of polycarbonate (TS-2050, manufactured by Teijin Chemicals Ltd.)

Leveling agent: 0.0005 parts of silicone oil (KF-50, manufactured by Shin-Etsu Chemical Co., Ltd.)

Solvent: 100 parts of tetrahydrofuran

These materials are mixed with each other by stirring to such an extent that all of the materials are completely dissolved, thereby preparing a coating liquid for forming a charge-transporting layer.

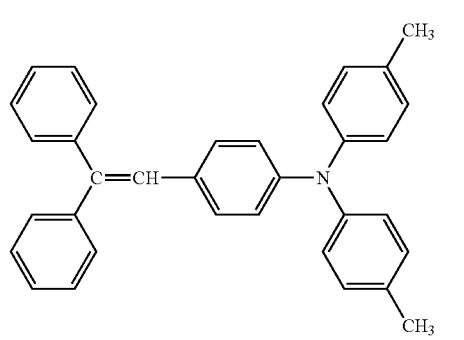

CTM 1

The coating liquid for forming a charge-transporting layer is applied onto the charge-generating layer by dip coating and then dried at 150° C. for 30 minutes to form a charge-transporting layer having an average thickness of 25 μm.

Through the above-mentioned process, a photoreceptor of Example 1 is produced.

Example 2

A photoreceptor of Examples 2 is produced as in Example 1 except that the compound represented by General Formula (ID) is changed from the exemplary compound (ID-1) to the exemplary compound (ID-2) in the formation of the undercoat layer. The average thickness of the undercoat layer is 7 μm.

Example 3

A photoreceptor of Examples 3 is produced as in Example 1 except that the compound represented by General Formula (ID) is changed from the exemplary compound (ID-1) to the exemplary compound (ID-3) in the formation of the undercoat layer. The average thickness of the undercoat layer is 5 μm.

Example 4

A photoreceptor of Example 4 is produced as in Example 1 except that titanium oxide particles to be treated with the silane coupling agent in the formation of the undercoat layer are changed to zinc oxide particles (average particle size: 70 nm, manufactured by TAYCA CORPORATION, and specific surface area: 15 m²/g).

Comparative Examples 1 to 3

Photoreceptors of Comparative Examples 1 to 3 are produced as in Examples 1 to 3, respectively, except that zinc oxide particles prepared by a wet process and having an average particle size of 50 nm (surface-untreated zinc oxide particles) are used in place of the surface-treated titanium oxide particles in the formation of the undercoat layer. The amount of the surface-untreated zinc oxide particles is 100 parts.

Evaluations

The photoreceptors produced in Examples and Comparative Examples are individually attached to an evaluation apparatus that is an electrophotographic image forming apparatus [digital copying machine (RICOH ProC900 manufactured by Ricoh Company Ltd.)].

Then, 50,000 sheets having a black test chart (percentage of image area: 5%) are continuously output from the evaluation apparatus at 23° C. and 55% RH [photoreceptor wearing process (1)].

Furthermore, 120,000 sheets having a black test chart (percentage of image area: 5%) are separately continuously output from the evaluation apparatus at 23° C. and 55% RH [photoreceptor wearing process (2)].

Residual Potential

The surface potential of each of the photoreceptors is measured individually before the photoreceptor wearing processes and after the photoreceptor wearing processes (1) and (2). The developing device used in the evaluation apparatus is modified to have a potential sensor and attached to the evaluation apparatus. The potential is measured as follows.

A current applied to wires is −1800 μA, and a grid voltage is −800 V. A solid image is printed on the entire surfaces of 100 sheets of A3 paper in the longitudinal direction thereof, and then the potential (VL) at the exposure part at the printing of the first sheet and 100th sheet is measured. The measurement is performed with a surface potential meter (MODEL 344 surface potential meter, manufactured by TREK JAPAN), and the values on the surface potential meter are recorded with an oscilloscope at 100 signals or more per second. The result of the measurement is evaluated on the basis of the following criteria.

The evaluation is performed at 23° C. and 55% RH.

Evaluation Criteria

A: Difference in the potential (ΔVL) at the exposure part between the first sheet and the 100th sheet is less than 10 V B: Difference in the potential (ΔVL) at the exposure part between the first sheet and the 100th sheet is 10 V or more and less than 30 V C: Difference in the potential (ΔVL) at the exposure part between the first sheet and the 100th sheet is 30 V or more Evaluation of Image Images are output individually before the photoreceptor wearing processes and after the photoreceptor wearing processes (1) and (2) at 23° C. and 55% RH, and the occurrence of scumming and uneven image density are evaluated.

In order to evaluate the occurrence of scumming, five sheets of gross-coated paper of which a white image has been formed on the entire surface are continuously output. The number of visible scumming is counted at any 10 points on the output gross-coated paper in a visual field of 8 mm×11 mm, and the average thereof is calculated. The result of the calculation is evaluated on the basis of the following criteria.

Evaluation Criteria

A: 10 or less

B: More than 10 but 20 or less

C: More than 20

In order to evaluate uneven image density, 100 sheets of paper on which a half-tone image has been formed are continuously output, and the first and 100th output paper are subjected to visual evaluation of uneven image density. The evaluation criteria are as follows.

A: No uneven image density observed

B: Uneven image density observed, but practically no problem

C: Uneven image density clearly observed

TABLE 1

| | Components of undercoat layer | | | Residual potential Photoreceptor wearing process | | | Evaluation of Scumming Photoreceptor wearing process | | | Evaluation of uneven image density Photoreceptor wearing process | | |
|---|---|---|---|---|---|---|---|---|---|---|---|---|
| | Metal oxide particles | Silane coupling agent | | | After process | After process | | After process | After process | | After process | After process |
| | Type | Type | Amount* | Before | (1) | (2) | Before | (1) | (2) | Before | (1) | (2) |
| Example 1 | TiO$_2$ | KBM603 | 12.5 parts | A | B | B | A | A | A | A | A | A |
| Example 2 | TiO$_2$ | KBM603 | 12.5 parts | A | B | B | A | A | A | A | A | A |
| Example 3 | TiO$_2$ | KBM603 | 12.5 parts | A | B | B | A | A | A | A | A | A |
| Example 4 | ZnO | KBM603 | 12.5 parts | A | B | B | A | A | A | A | A | A |
| Comparative Example 1 | ZnO | None | 0 | A | B | C | A | A | B | A | A | B |
| Comparative Example 2 | ZnO | None | 0 | A | B | C | A | A | B | A | A | B |
| Comparative Example 3 | ZnO | None | 0 | A | B | C | A | B | C | A | A | B |

*part of silane coupling agent relative to 1 part of compound represented by General Formula (ID)

From the above results, scumming caused in repeated formation of images is reduced more in the photoreceptors of Examples than in the photoreceptors of Comparative Examples.

Furthermore, an increase in residual potential and the occurrence of uneven image density are reduced in the photoreceptors of Examples even though images are repeatedly formed as compared with the photoreceptors of Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:
    a conductive substrate;
    an undercoat layer formed on the conductive substrate and containing a polyurethane resin, metal oxide particles, a silane coupling agent having an amino group, and a compound represented by General Formula (ID), wherein an amount of the silane coupling agent is approximately from 5 parts by mass to 15 parts by mass relative to 1 part by mass of the compound represented by General Formula (ID):

General Formula (ID)

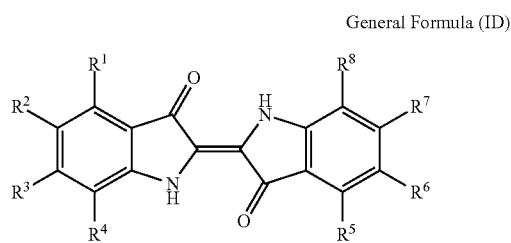

where $R^1$ to $R^8$ each independently represents a hydrogen atom, a nitro group, a cyano group, a halogen atom, a hydroxyl group, a saturated or unsaturated aliphatic hydrocarbon group optionally having a substituent, an aromatic hydrocarbon group optionally having a substituent, an alkoxy group optionally having a substituent, an aryloxy group optionally having a substituent, a sulfo group optionally having a substituent, an amino group, an alkylamino group optionally having a substituent, or an arylamino group optionally having a substituent; and $R^1$ and $R^2$, $R^2$ and $R^3$, $R^3$ and $R^4$, $R^5$ and $R^6$, $R^6$ and $R^7$, and $R^7$ and $R^8$ are optionally individually bonded to each other to form aromatic rings; and
    a photosensitive layer formed on the undercoat layer.

2. The electrophotographic photoreceptor according to claim 1, wherein the metal oxide particles are titanium oxide particles.

3. The electrophotographic photoreceptor according to claim 1, wherein the silane coupling agent is present in the undercoat layer in a state in which surfaces of the metal oxide particles are treated with the silane coupling agent.

4. A process cartridge comprising the electrophotographic photoreceptor according to claim 1, wherein
    the process cartridge is configured to be removably attached to an image forming apparatus.

5. An image forming apparatus comprising:
    the electrophotographic photoreceptor according to claim 1;
    a charging unit that charges a surface of the electrophotographic photoreceptor;
    an electrostatic latent image forming unit that forms an electrostatic latent image on the charged surface of the electrophotographic photoreceptor;
    a developing unit that develops the electrostatic latent image on the surface of the electrophotographic photoreceptor with a developer containing toner to form a toner image; and
    a transfer unit that transfers the toner image to a surface of a recording medium.

6. The electrophotographic photoreceptor according to claim 1, wherein the amount of the silane coupling agent is from 7 parts by mass to 15 parts by mass relative to 1 part by mass of the compound represented by General Formula (ID).

7. The electrophotographic photoreceptor according to claim 6, wherein the amount of the silane coupling agent is from 10 parts by mass to 15 parts by mass relative to 1 part by mass of the compound represented by General Formula (ID).

8. The electrophotographic photoreceptor according to claim 1, wherein the silane coupling agent is at least one selected from the group consisting of 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

9. The electrophotographic photoreceptor according to claim 8, wherein the silane coupling agent is N-2-(aminoethyl)-3-aminopropyltrimethoxysilane.

* * * * *